UNITED STATES PATENT OFFICE.

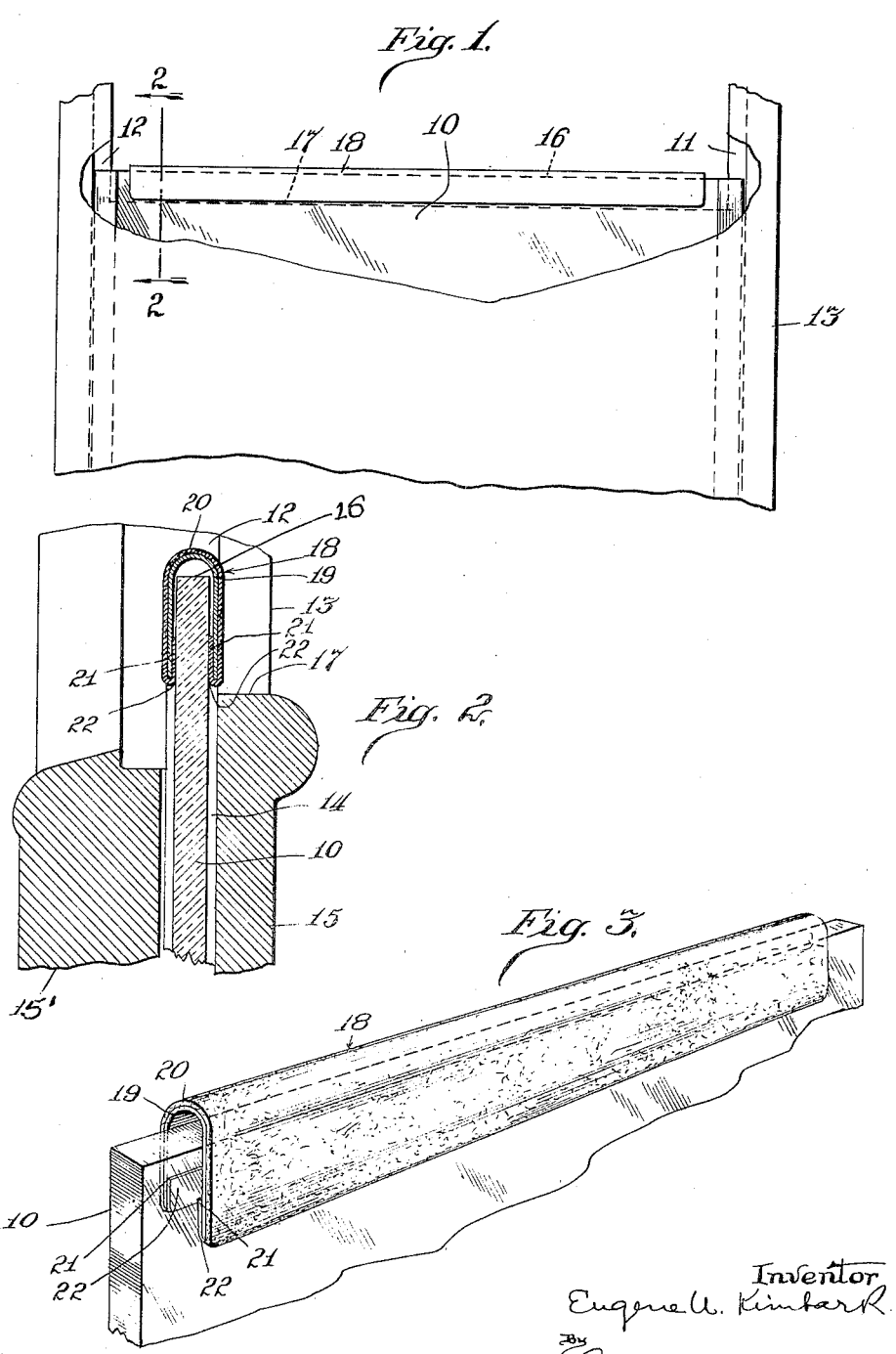

EUGENE U. KIMBARK, OF EVANSTON, ILLINOIS.

PROTECTING-STRIP FOR GLASS WINDOWS OR THE LIKE.

1,375,914.                     Specification of Letters Patent.     Patented Apr. 26, 1921.

Application filed March 20, 1920. Serial No. 367,304.

*To all whom it may concern:*

Be it known that I, EUGENE U. KIMBARK, a citizen of the United States, residing at Evanston, in the county of Cook and State of Illinois, have invented certain new and useful Improvements in Protecting - Strips for Glass Windows or the like, of which the following is a specification.

This invention relates to protecting devices for glass windows or the like and has for its primary object to provide a device of this character which may be cheaply and easily made and readily applied to or removed from the edges of glass windows or the like, to protect the same from damage.

The invention consists in the novel construction and devices for carrying out the above stated object, and such other incidental objects as may appear from the following description and claims.

The invention is illustrated in a preferred embodiment in the accompanying drawings, wherein—

Fig. 1 is an elevation of a window construction to which is applied a protecting strip embodying the principles of my invention;

Fig. 2 is a vertical section taken on the line 2—2 of Fig. 1; and

Fig. 3 is a perspective of a glass pane having the protecting strip applied to the exposed edge thereof.

Like characters of reference refer to like parts in the several figures of the drawing.

For the purpose of illustration I have shown a form of window construction commonly used in automobiles wherein the sliding glass pane is not set within a window sash but the edges of the glass itself slide within suitable guides in the window frame. In this construction the vertical edges of the glass pane 10 slide within grooves 11 and 12 in the window frame 13. The window pane 10 is adapted to be opened by lowering the same within the space 14 formed between the inner and outer members 15 and 15′ of the frame structure. The upper edge 16 of the pane 10 projects a short distance above the lower edge 17 of the window frame, and thus exposed, is likely to be damaged.

The protecting strip 18 is adapted to fit over the exposed edge of the glass and thus protect the same from damage resulting from incidental knocks or blows. The strip 18 consists of a body 19 formed from a strip of any suitable material bent into channel or U-shaped form so as to frictionally engage the faces of the glass pane. Preferably the strip 19 is formed of some resilient material, such as galvanized iron or brass, and is covered with any suitable covering material 20, such as fabric or leather, secured thereto by any suitable adhesive. The covering material extends a short distance around the free edges 21 of the strip 19 and into the interior of the channel, so as to provide surfaces 22 which serve to increase the friction between the strips and the glass. The length of the strip depends upon the width of the particular glass pane upon which it is used; it is made long enough to cover substantially the entire exposed edge.

I claim:

1. A protecting strip of the class described adapted to fit over the exposed edge of a glass window pane comprising a metal strip U-shaped in cross-section and having a flexible covering material on the exterior thereof which extends partially into the interior thereby to increase the friction of said strip on the glass.

2. A protecting device adapted to frictionally engage the exposed edge of a window pane comprising a metallic strip of U-shaped cross-section adapted to frictionally engage the edge of a pane of glass and a covering material secured to the exterior thereof.

3. A protecting strip adapted to protect the exposed edge of a sliding glass window-pane, comprising a resilient metallic strip, U-shaped in cross-section, adapted to fit over the exposed edge and grip the glass by spring pressure, and a covering fabric secured to the exterior of said strip and also extending into the interior so as to contact with the glass.

4. A detachable protecting strip of the class described comprising a resilient metal strip U-shaped in cross-section and adapted to be applied to and resiliently engage the exposed edge of a glass window pane to protect the same.

EUGENE U. KIMBARK.